United States Patent
Cygan, Jr. et al.

(10) Patent No.: US 9,759,140 B2
(45) Date of Patent: Sep. 12, 2017

(54) FIFTY PERCENT BURN CRANKSHAFT ANGLE ESTIMATION SYSTEMS AND METHODS

(71) Applicant: GM Global Technology Operations LLC, Detroit, MI (US)

(72) Inventors: Gary Robert Cygan, Jr., West Bloomfield, MI (US); Chao F. Daniels, Superior Township, MI (US); Jason R. Bartak, Ortonville, MI (US); Ronald J. Herrin, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 182 days.

(21) Appl. No.: 14/689,740

(22) Filed: Apr. 17, 2015

(65) Prior Publication Data

US 2016/0258380 A1    Sep. 8, 2016

Related U.S. Application Data

(60) Provisional application No. 62/128,700, filed on Mar. 5, 2015.

(51) Int. Cl.
*F02D 35/02* (2006.01)
*F02D 41/18* (2006.01)

(52) U.S. Cl.
CPC .......... *F02D 35/023* (2013.01); *F02D 35/028* (2013.01); *F02D 41/18* (2013.01); *F02D 2200/101* (2013.01); *Y02T 10/144* (2013.01)

(58) Field of Classification Search
CPC .. F02D 41/3005; F02D 35/023; F02D 35/028; F02D 35/0007; Y02T 10/144
See application file for complete search history.

(56) References Cited

U.S. PATENT DOCUMENTS

| | | | | |
|---|---|---|---|---|
| 4,964,318 A | * | 10/1990 | Ganoung | B60W 30/18 123/478 |
| 6,279,551 B1 | * | 8/2001 | Iwano | F02B 37/18 123/564 |
| 9,043,122 B2 | * | 5/2015 | Glugla | F02D 43/00 123/406.18 |
| 9,080,523 B1 | * | 7/2015 | Ulrey | F02D 13/0242 |
| 9,181,892 B2 | * | 11/2015 | Glugla | F02D 43/00 |
| 2012/0065857 A1 | * | 3/2012 | Nanua | F02D 41/12 701/70 |
| 2013/0184967 A1 | * | 7/2013 | Kang | F02D 41/14 701/102 |
| 2014/0000552 A1 | * | 1/2014 | Glugla | F02D 43/00 123/295 |

(Continued)

OTHER PUBLICATIONS

U.S. Appl. No. 14/689,530, filed Apr. 17, 2015, Cygan Jr. et al.

*Primary Examiner* — Joseph Dallo

(57) ABSTRACT

An engine control system of a vehicle includes an estimation module and an actuator module. The estimation module estimates a crankshaft angle where 50 percent of a mass of fuel is burned during a combustion event based on: a combustion speed when a crankshaft of an engine is at a predetermined position during the combustion event; an engine speed; a mass of air per cylinder (APC); a spark timing; and a predetermined spark timing. The actuator module controls an engine actuator based on the crankshaft angle where 50 percent of the mass of fuel is burned during the combustion event.

20 Claims, 4 Drawing Sheets

(56) References Cited

U.S. PATENT DOCUMENTS

| | | | |
|---|---|---|---|
| 2015/0198099 A1* | 7/2015 | Ulrey | F02D 13/0242 60/602 |
| 2015/0204249 A1* | 7/2015 | Glugla | F02B 37/168 123/90.15 |
| 2015/0252747 A1* | 9/2015 | Glugla | F02D 43/00 123/295 |
| 2015/0316005 A1* | 11/2015 | Madison | F02M 26/04 60/602 |
| 2016/0258410 A1* | 9/2016 | Cygan, Jr. | F02P 5/145 |

* cited by examiner

FIFTY PERCENT BURN CRANKSHAFT ANGLE ESTIMATION SYSTEMS AND METHODS

CROSS-REFERENCE TO RELATED APPLICATIONS

This application claims the benefit of U.S. Provisional Application No. 62/128,700, filed on Mar. 5, 2015. The disclosure of the above application is incorporated herein by reference in its entirety.

This application is related to U.S. patent application Ser. No. 14/689,530 filed on Apr. 17, 2015 which claims the benefit of U.S. Provisional Application No. 62/128,741 filed on Mar. 5, 2015. The disclosure of the above application is incorporated herein by reference in its entirety.

FIELD

The present disclosure relates to internal combustion engines and more particularly to systems and methods for estimating crankshaft angles where fifty percent of injected fuel is burned within cylinders.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. In some types of engines, air flow into the engine may be regulated via a throttle. The throttle may adjust throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

Combustion of an air/fuel mixture within a cylinder begins when a spark plug generates spark within the cylinder. The mass fraction of fuel burned during a combustion event may be referred to as mass fraction burned (MFB). Various parameters for where various MFBs occur may be used to evaluate how fast the combustion event occurs. For example, a crankshaft angle (CA) where 50 percent of a mass of fuel has been burned during a combustion event is referred to as CA50.

SUMMARY

In a feature, an engine control system of a vehicle is disclosed. An estimation module estimates a crankshaft angle where 50 percent of a mass of fuel is burned during a combustion event based on: a combustion speed when a crankshaft of an engine is at a predetermined position during the combustion event; an engine speed; a mass of air per cylinder (APC); a spark timing; and a predetermined spark timing. An actuator module controls an engine actuator based on the crankshaft angle where 50 percent of the mass of fuel is burned during the combustion event.

In further features, the estimation module estimates the combustion speed based on an intake cam phaser angle, an exhaust cam phaser angle, a barometric pressure, the APC, and the engine speed.

In further features: determines a second crankshaft angle where 50 percent of the mass of fuel is burned during the combustion event based on the engine speed, the APC, the spark timing, and the combustion speed; determines a third crankshaft angle where 50 percent of the mass of fuel is burned during the combustion event based on the engine speed, the APC, the predetermined spark timing, and the combustion speed; and determines the crankshaft angle where 50 percent of the mass of fuel is burned during the combustion event based on the second and third crankshaft angles.

In further features, the estimation module: determines a fourth crankshaft angle where 50 percent of the mass of fuel is burned during the combustion event based on the engine speed and the APC; and determines the crankshaft angle where 50 percent of the mass of fuel is burned during the combustion event based on the second, third, and fourth crankshaft angles.

In further features, the estimation module: determines a difference between the second and third crankshaft angles; and sets the crankshaft angle where 50 percent of the mass of fuel is burned during the combustion event based on a sum of the difference and the fourth crankshaft angle.

In further features, the estimation module determines the second and third crankshaft angles using one relationship that relates engine speeds, combustion speeds, APCs, and spark timings to crankshaft angles where 50 percent of masses of fuel are burned.

In further features, the estimation module determines the predetermined spark timing based on the engine speed and the APC.

In further features, the predetermined position is 55 degrees before top dead center.

In further features, the actuator module opens a wastegate of a turbocharger in response to retardation of the crankshaft angle where 50 percent of the mass of fuel is burned.

In further features, the actuator module increases fueling in response to retardation of the crankshaft angle where 50 percent of the mass of fuel is burned.

In a feature, an engine control method for a vehicle is disclosed. The engine control method includes estimating a crankshaft angle where 50 percent of a mass of fuel is burned during a combustion event based on: a combustion speed when a crankshaft of an engine is at a predetermined position during the combustion event; an engine speed; a mass of air per cylinder (APC); a spark timing; and a predetermined spark timing. The engine control method also includes controlling an engine actuator based on the crankshaft angle where 50 percent of the mass of fuel is burned during the combustion event.

In further features, the engine control method further includes estimating the combustion speed based on an intake cam phaser angle, an exhaust cam phaser angle, a barometric pressure, the APC, and the engine speed.

In further features, the engine control method further includes: determining a second crankshaft angle where 50 percent of the mass of fuel is burned during the combustion event based on the engine speed, the APC, the spark timing, and the combustion speed; determining a third crankshaft angle where 50 percent of the mass of fuel is burned during the combustion event based on the engine speed, the APC, the predetermined spark timing, and the combustion speed; and estimating the crankshaft angle where 50 percent of the mass of fuel is burned during the combustion event based on the second and third crankshaft angles.

In further features, the engine control method further includes: determining a fourth crankshaft angle where 50 percent of the mass of fuel is burned during the combustion event based on the engine speed and the APC; and estimating the crankshaft angle where 50 percent of the mass of fuel is burned during the combustion event based on the second, third, and fourth crankshaft angles.

In further features, the engine control method further includes: determining a difference between the second and third crankshaft angles; and setting the crankshaft angle where 50 percent of the mass of fuel is burned during the combustion event based on a sum of the difference and the fourth crankshaft angle.

In further features, the engine control method further includes determining the second and third crankshaft angles using one relationship that relates engine speeds, combustion speeds, APCs, and spark timings to crankshaft angles where 50 percent of masses of fuel are burned.

In further features, the engine control method further includes determining the predetermined spark timing based on the engine speed and the APC.

In further features, the predetermined position is 55 degrees before top dead center.

In further features, the controlling an engine actuator includes opening a wastegate of a turbocharger in response to retardation of the crankshaft angle where 50 percent of the mass of fuel is burned.

In further features, the controlling an engine actuator includes increasing fueling in response to retardation of the crankshaft angle where 50 percent of the mass of fuel is burned.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Internal combustion engines combust an air and fuel mixture within cylinders to generate torque. Combustion within a cylinder begins when a spark plug generates spark within the cylinder. One or more engine actuators may be controlled based on crankshaft angles where respective fractions of fuel are burned during a combustion cycle. The crankshaft angle (CA) where fifty (50) percent of a mass of fuel is burned is referred to as CA50.

An engine control module (ECM) of the present disclosure estimates a present CA50 of an engine. The ECM estimates the present CA50 based on a speed of combustion at a predetermined crankshaft angle (e.g., 55 degrees before top dead center), engine speed, air per cylinder, and a relationship between spark timing and predetermined spark timing for the present engine operating conditions. The ECM may control one or more engine actuators based on the present CA50. For example, the ECM may open a turbocharger wastegate as the present CA50 retards to minimize an increase in turbocharger output. Additionally or alternatively, the ECM may increase fuel injection to minimize an exhaust temperature increase as the present CA50 retards.

Figure 1:
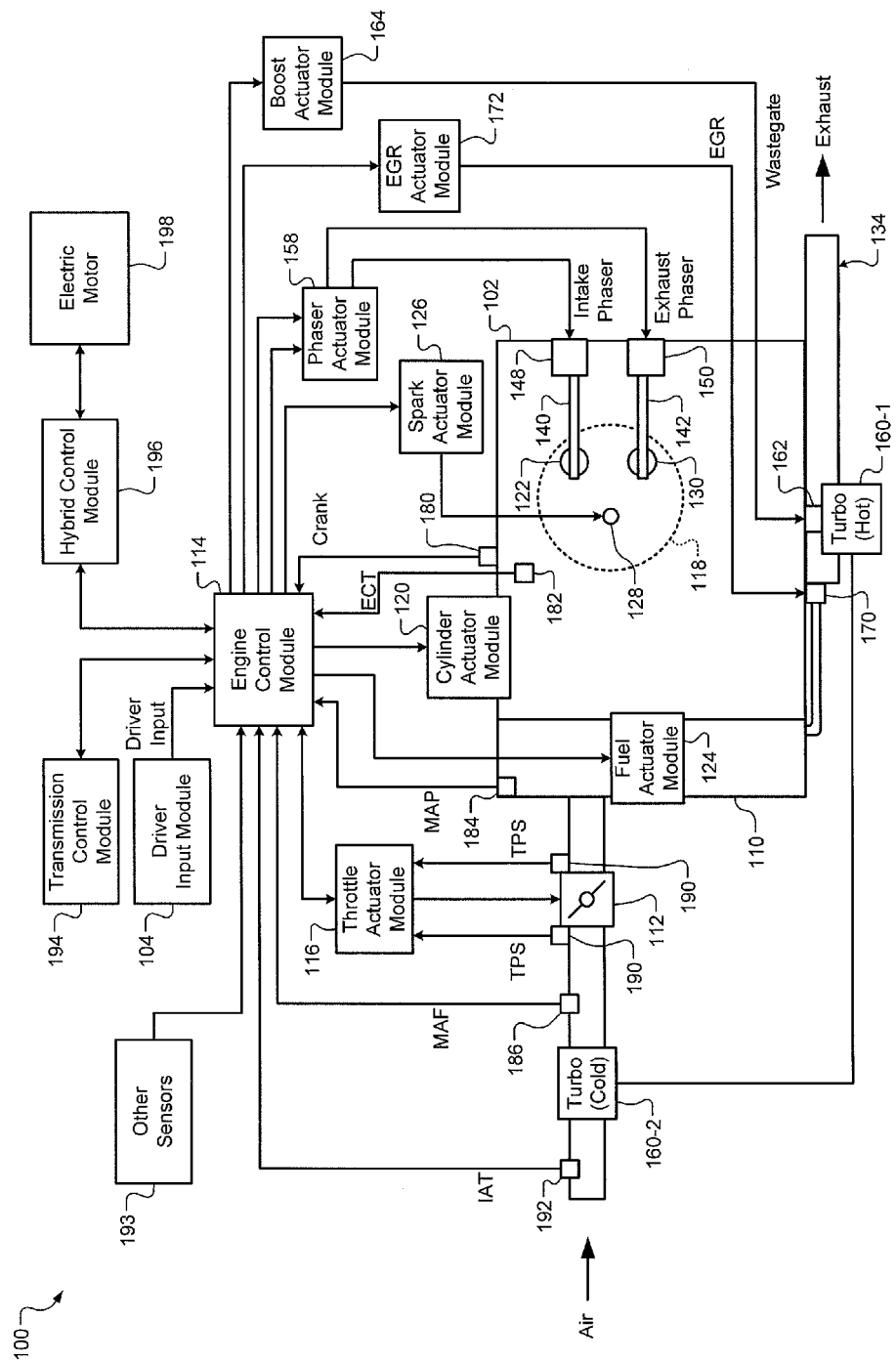
FIG. 1 is a functional block diagram of an example engine system.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The engine 102 may be a gasoline spark ignition internal combustion engine.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various other implementations, the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a turbocharger that includes a hot turbine 160-1 that is powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. In various implementations, two or more turbochargers may be implemented and may be controlled by the boost actuator module 164.

An air cooler (not shown) may transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172 based on signals from the ECM 114.

A position of the crankshaft may be measured using a crankshaft position sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. The engine system 100 may also include one or more other sensors 193, such as an ambient humidity sensor, one or more knock sensors, a compressor outlet pressure sensor and/or a throttle inlet pressure sensor, a wastegate position sensor, an EGR position sensor, and/or one or more other suitable sensors. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an engine actuator. For example, the throttle actuator module 116 may adjust opening of the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The phaser actuator module 158 may control the intake and exhaust cam phasers 148 and 150 to achieve target intake and exhaust cam phaser angles, respectively. The EGR actuator module 172 may control the EGR valve 170 to achieve a target EGR opening area. The boost actuator module 164 controls the wastegate 162 to achieve a target wastegate opening area. The cylinder actuator module 120 controls cylinder deactivation to achieve a target number of activated or deactivated cylinders. The ECM 114 generates the target values for the engine actuators to cause the engine 102 to generate a target engine output torque.

Figure 2:
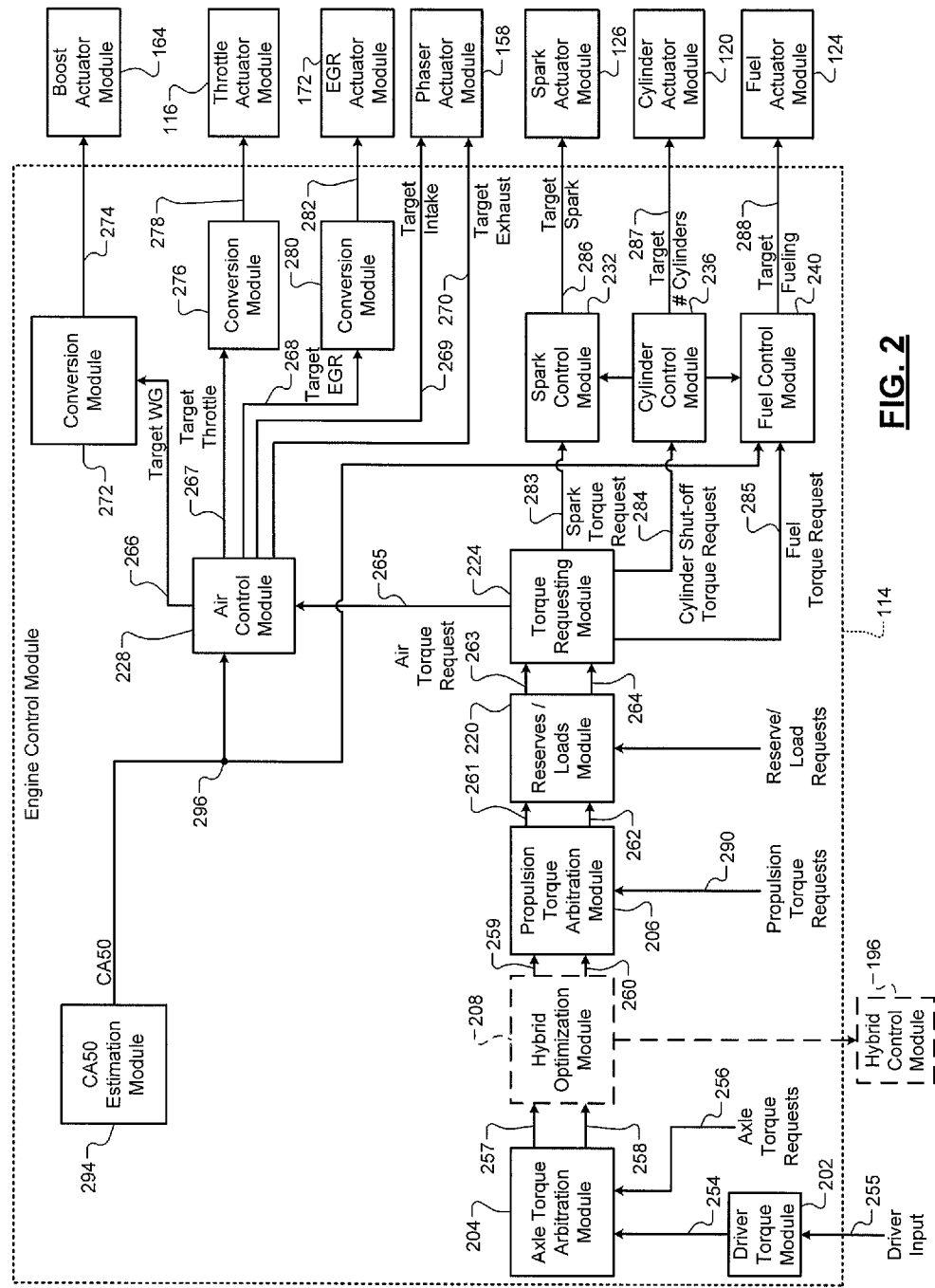
FIG. 2 is a functional block diagram of an example engine control system.

Referring now to FIG. 2, a functional block diagram of an example engine control system is presented. An example implementation of the ECM 114 includes a driver torque module 202, an axle torque arbitration module 204, and a propulsion torque arbitration module 206. The ECM 114 may include a hybrid optimization module 208. The ECM 114 also includes a reserves/loads module 220, a torque requesting module 224, an air control module 228, a spark control module 232, a cylinder control module 236, and a fuel control module 240.

The driver torque module 202 may determine a driver torque request 254 based on a driver input 255 from the driver input module 104. The driver input 255 may be based on, for example, a position of an accelerator pedal and a position of a brake pedal. The driver input 255 may also be based on cruise control, which may be an adaptive cruise control system that varies vehicle speed to maintain a predetermined following distance. The driver torque module 202 may store one or more mappings of accelerator pedal position to target torque and may determine the driver torque request 254 based on a selected one of the mappings.

An axle torque arbitration module 204 arbitrates between the driver torque request 254 and other axle torque requests 256. Axle torque (torque at the wheels) may be produced by various sources including the engine 102 and/or one or more electric motors.

The axle torque arbitration module 204 outputs a predicted torque request 257 and an immediate torque request 258 based on the results of arbitrating between the received torque requests 254 and 256. As described below, the predicted and immediate torque requests 257 and 258 from the axle torque arbitration module 204 may selectively be adjusted by other modules of the ECM 114 before being used to control the engine actuators.

In general terms, the immediate torque request 258 may be an amount of currently desired axle torque, while the predicted torque request 257 may be an amount of axle torque that may be needed on short notice. The ECM 114 controls the engine system 100 to produce an axle torque equal to the immediate torque request 258. However, different combinations of target values may result in the same axle torque. The ECM 114 may therefore adjust the target values to enable a faster transition to the predicted torque request 257, while still maintaining the axle torque at the immediate torque request 258.

In various implementations, the predicted torque request 257 may be set based on the driver torque request 254. The immediate torque request 258 may be set to less than the predicted torque request 257 under some circumstances, such as when the driver torque request 254 is causing wheel slip on an icy surface. In such a case, a traction control system (not shown) may request a reduction via the immediate torque request 258, and the ECM 114 reduces the engine torque output to the immediate torque request 258. However, the ECM 114 performs the reduction so the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay.

Fast engine actuators are used to increase or decrease current axle torque with minimal delay. Fast engine actuators are defined in contrast with slow engine actuators.

Fast engine actuators can change the axle torque more quickly than slow engine actuators. Slow actuators may respond more slowly to changes in their respective target values than fast actuators do. For example, a slow actuator may include mechanical components that require time to move from one position to another in response to a change in target value. A slow actuator may also be characterized by the amount of time it takes for the axle torque to begin to change once the slow actuator begins to implement the changed target value. Generally, this amount of time will be longer for slow actuators than for fast actuators. In addition, even after beginning to change, the axle torque may take longer to fully respond to a change in a slow actuator.

For example only, the spark actuator module 126 may be a fast actuator. Spark-ignition engines may combust fuels including, for example, gasoline and ethanol, by applying a spark. By way of contrast, the throttle actuator module 116 may be a slow actuator.

For example, as described above, the spark actuator module 126 can vary the spark timing for a next firing event when the spark timing is changed between a last firing event and the next firing event. By way of contrast, changes in throttle opening take longer to affect engine output torque. The throttle actuator module 116 changes the throttle opening by adjusting the angle of the blade of the throttle valve 112. Therefore, when the target value for opening of the throttle valve 112 is changed, there is a mechanical delay as the throttle valve 112 moves from its previous position to a new position in response to the change. In addition, air flow changes based on the throttle opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening to a value that would allow the engine 102 to produce the predicted torque request 257. Meanwhile, the spark timing can be set based on the immediate torque request 258, which is less than the predicted torque request 257. Although the throttle opening generates enough air flow for the engine 102 to produce the predicted torque request 257, the spark timing is retarded (which reduces torque) based on the immediate torque request 258. The engine output torque will therefore be equal to the immediate torque request 258.

When additional torque is needed, the spark timing can be set based on the predicted torque request 257 or a torque between the predicted and immediate torque requests 257 and 258. By the following firing event, the spark actuator module 126 may return the spark timing to an optimum spark timing, which allows the engine 102 to produce the full engine output torque achievable with the air flow already present. The engine output torque may therefore be quickly increased to the predicted torque request 257 without experiencing delays from changing the throttle opening.

The axle torque arbitration module 204 may output the predicted torque request 257 and the immediate torque request 258 to a propulsion torque arbitration module 206. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 290 and the converted predicted and immediate torque requests. The propulsion torque arbitration module 206 generates an arbitrated predicted torque request 261 and an arbitrated immediate torque request 262. The arbitrated torque requests 261 and 262 may be generated by selecting a winning request from among received torque requests. Alternatively or additionally, the arbitrated torque requests may be generated by modifying one of the received requests based on another one or more of the received torque requests.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 to the torque requesting module 224.

The torque requesting module 224 receives the adjusted predicted and immediate torque requests 263 and 264. The torque requesting module 224 determines how the adjusted predicted and immediate torque requests 263 and 264 will be achieved. The torque requesting module 224 may be engine type specific. For example, the torque requesting module 224 may be implemented differently or use different control schemes for spark-ignition engines versus compression-ignition engines.

In various implementations, the torque requesting module 224 may define a boundary between modules that are common across all engine types and modules that are engine type specific. For example, spark-ignition and compression-ignition are two different types of engines. Modules prior to the torque requesting module 224, such as the propulsion torque arbitration module 206, may be common across engine types, while the torque requesting module 224 and subsequent modules may be engine type specific.

The torque requesting module 224 determines an air torque request 265 based on the adjusted predicted and immediate torque requests 263 and 264. The air torque request 265 may be a brake torque. Brake torque may refer to torque at the crankshaft under the current operating conditions.

Target values for airflow controlling engine actuators are determined based on the air torque request 265. More specifically, based on the air torque request 265 and/or one or more other parameters, the air control module 228 determines a target wastegate opening area 266, a target throttle opening area 267, a target EGR opening area 268, a target intake cam phaser angle 269, and a target exhaust cam phaser angle 270.

The boost actuator module 164 controls the wastegate 162 to achieve the target wastegate opening area 266. For example, a first conversion module 272 may convert the target wastegate opening area 266 into a target duty cycle 274 to be applied to the wastegate 162, and the boost actuator module 164 may apply a signal to the wastegate 162 based on the target duty cycle 274. In various implementations, the first conversion module 272 may convert the target wastegate opening area 266 into a target wastegate position (not shown), and convert the target wastegate position into the target duty cycle 274.

The throttle actuator module 116 controls the throttle valve 112 to achieve the target throttle opening area 267. For example, a second conversion module 276 may convert the target throttle opening area 267 into a target duty cycle 278 to be applied to the throttle valve 112, and the throttle actuator module 116 may apply a signal to the throttle valve 112 based on the target duty cycle 278. In various implementations, the second conversion module 276 may convert the target throttle opening area 267 into a target throttle position (not shown), and convert the target throttle position into the target duty cycle 278.

The EGR actuator module 172 controls the EGR valve 170 to achieve the target EGR opening area 268. For example, a third conversion module 280 may convert the target EGR opening area 268 into a target duty cycle 282 to be applied to the EGR valve 170, and the EGR actuator module 172 may apply a signal to the EGR valve 170 based on the target duty cycle 282. In various implementations, the third conversion module 280 may convert the target EGR opening area 268 into a target EGR position (not shown), and convert the target EGR position into the target duty cycle 282.

The phaser actuator module 158 controls the intake cam phaser 148 to achieve the target intake cam phaser angle 269. The phaser actuator module 158 also controls the exhaust cam phaser 150 to achieve the target exhaust cam phaser angle 270. In various implementations, a fourth conversion module (not shown) may be included and may convert the target intake and exhaust cam phaser angles into target intake and exhaust duty cycles, respectively. The phaser actuator module 158 may apply the target intake and exhaust duty cycles to the intake and exhaust cam phasers 148 and 150, respectively.

The torque requesting module 224 also generates a spark torque request 283, a cylinder shut-off torque request 284, and a fuel torque request 285 based on the predicted and immediate torque requests 263 and 264. The spark control module 232 may determine how much to retard the spark timing (which reduces engine output torque) from an optimum spark timing based on the spark torque request 283. For example only, a torque relationship may be inverted to solve for a target spark timing 286. For a given torque request ($T_{Req}$), the target spark timing ($S_T$) 286 may be determined based on:

$$S_T = f^1(T_{Req}, APC, I, E, AF, OT, \#),$$

where APC is a mass of air per cylinder (APC), I is an intake valve phasing value, E is an exhaust valve phasing value, AF is an air/fuel ratio, OT is an oil temperature, and # is a number of activated cylinders. This relationship may be embodied as an equation and/or as a lookup table. The air/fuel ratio (AF) may be the actual air/fuel ratio, as reported by the fuel control module 240.

When the spark timing is set to the optimum spark timing, the resulting torque may be as close to a minimum spark advance for best torque (MBT) as possible. Best torque may refer to a maximum engine output torque that can be generated for a given airflow for various spark timings, while using fuel having an octane rating greater than a predetermined octane rating and using stoichiometric fueling. The spark timing at which the best toque occurs for a given set of airflow conditions may be referred to as an MBT spark timing. The optimum spark timing may differ slightly from MBT spark timing because of, for example, fuel quality (such as when lower octane fuel is used) and environmental factors, such as ambient humidity and temperature. The engine output torque at the optimum spark timing may therefore be less than MBT. For example only, a mapping (e.g., look up table) of optimum spark timings for different engine operating conditions may be generated during a calibration phase of vehicle design, and the ECM 114 may determine the optimum spark timing using the mapping based on current engine operating conditions.

The cylinder shut-off torque request 284 may be used by the cylinder control module 236 to determine a target number of cylinders to deactivate 287. In various implementations, a target number of cylinders to activate may be used. The cylinder actuator module 120 selectively activates and deactivates the valves of cylinders based on the target number 287.

The cylinder control module 236 may also instruct the fuel control module 240 to stop providing fuel for deactivated cylinders and may instruct the spark control module 232 to stop providing spark for deactivated cylinders. The spark control module 232 may stop providing spark to a cylinder once an fuel/air mixture that is already present in the cylinder has been combusted.

The fuel control module 240 may vary the amount of fuel provided to each cylinder based on the fuel torque request 285. More specifically, the fuel control module 240 may generate target fueling parameters 288 based on the fuel torque request 285. The target fueling parameters 288 may include, for example, target mass of fuel, target injection starting timing, and target number of fuel injections.

During normal operation, the fuel control module 240 may operate in an air lead mode in which the fuel control module 240 attempts to maintain a stoichiometric air/fuel ratio by controlling fueling based on air flow. For example, the fuel control module 240 may determine a target fuel mass that will yield stoichiometric combustion when combined with a present APC. APC may be determined, for example, using a function or mapping that relates mass air flowrate (MAF) and number of activated cylinders to APC.

A crankshaft angle (CA) where 50 percent of a mass of fuel is burned during a combustion event is referred to as CA50 for the combustion event. The ECM 114 includes a CA50 estimation module 294 that determines a present CA50 296. The CA50 estimation module 294 updates the present CA50 296 for each combustion event. One or more actuator values may be adjusted based on the present CA50 296.

For example, the air control module 228 may increase the target wastegate opening area 266 as the present CA50 296 retards. As the present CA50 296 retards, more energy is input to the exhaust system, and the energy input increase may cause an increase in turbocharger output. Opening the wastegate 162 may offset the increase in the energy input to the exhaust system. Additionally or alternatively, the fuel control module 240 may increase the target fueling rate to provide cooling as the present CA50 296 retards. One or more other actuator values may be additionally or alternatively adjusted based on the present CA50 296.

Figure 3:
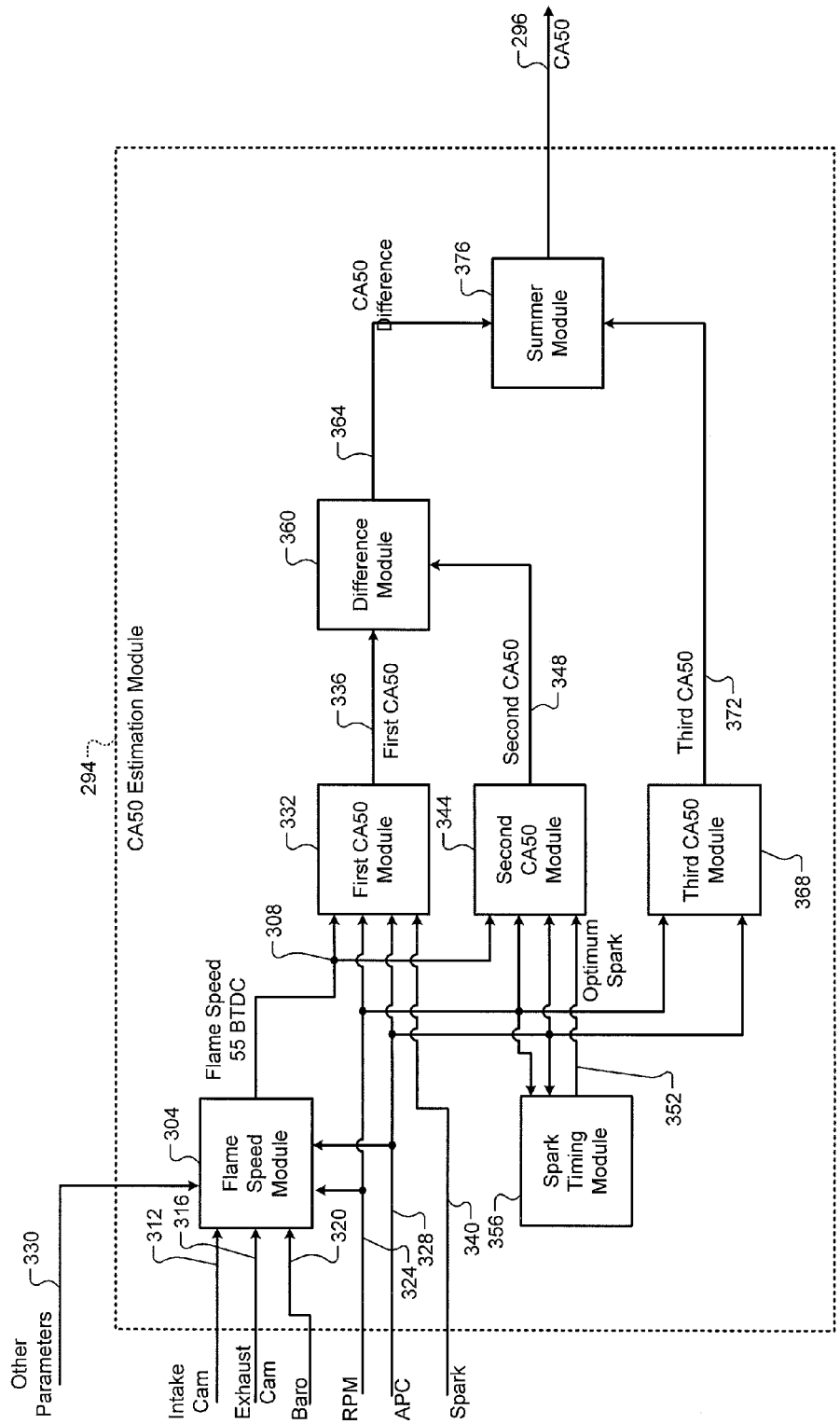
FIG. 3 is a functional block diagram of an example CA50 estimation module.

FIG. 3 is a functional block diagram of an example implementation of the CA50 estimation module 294. A flame speed module 304 determines a flame (e.g., laminar) speed 308 at 55 degrees before TDC (BTDC) of the compression/combustion stroke. The flame speed module 304 may update the flame speed 308 at 55 degrees BTDC for each combustion event. The flame speed 308 may also be referred to as combustion speed. While the example of the flame speed 308 at 55 degrees BTDC is provided, the flame speed at another predetermined crankshaft angle may be used.

The flame speed module 304 determines the flame speed 308 at 55 degrees BTDC based on an intake cam phaser angle 312, an exhaust cam phaser angle 316, a barometric pressure 320, an engine speed 324, and an APC 328. The flame speed module 304 may determine the flame speed 308 at 55 degrees BTDC further based on one or more other parameters 330. The other parameters 330 may include, for example, an EGR value (e.g., EGR valve opening, EGR flow rate), an amount of residual exhaust gas within the cylinder, the MAP, an air temperature within the intake manifold 110, an equivalence ratio of fueling, a type of fuel being used, and/or one or more other parameters. The flame speed module 304 may determine the flame speed 308 at 55 degrees BTDC using one of a function and a mapping that relates intake cam phaser angles, exhaust cam phaser angles, barometric pressures, engine speeds, and APCs to flame speeds at 55 degrees BTDC. In various implementations, one or more of the other parameters 330 may also be used as inputs to the function or mapping. The function or mapping may be calibrated, for example, using an artificial neural network (ANN) or in another suitable manner.

The intake cam phaser angle 312 may be, for example, measured using a sensor or the target intake cam phaser angle 269 may be used. The exhaust cam phaser angle 316 may be, for example, measured using a sensor or the target exhaust cam phaser angle 270 may be used. The barometric pressure 320 may be, for example, measured using a sensor or determined based on one or more other parameters. The engine speed 324 may be determined, for example, based on the crankshaft position signal generated by the crankshaft position sensor 180. The APC 328 may be determined, for example, using a function or a mapping that relates MAFs measured using the MAF sensor 186 and the number of activated cylinders to APCs.

A first CA50 module 332 determines a first CA50 336 based on the flame speed 308 at 55 degrees BTDC, the engine speed 324, the APC 328, and a spark timing 340. The first CA50 module 332 may update the first CA50 336 for each combustion event. The first CA50 module 332 may determine the first CA50 336, for example, using one of a function and a mapping that relates laminar flame speeds at 55 degrees BTDC, engine speeds, APCs, and spark timings to first CA50 values. The spark timing 340 may be, for example, the target spark timing 286 or the target spark timing 286 for a last combustion event. The function or mapping may be calibrated, for example, using an ANN or in another suitable manner.

A second CA50 module 344 determines a second CA50 348 based on the flame speed 308 at 55 degrees BTDC, the engine speed 324, the APC 328, and a predetermined optimum spark timing 352. The second CA50 module 344 may update the second CA50 348 for each combustion event. The second CA50 module 344 determines the second CA50 348 using the same function or mapping used by the first CA50 module 332. As described above, however, the second CA50 module 344 determines the second CA50 348 based on the optimum spark timing 352, while the first CA50 module 332 determines the first CA50 336 based on the spark timing 340.

A spark timing module 356 may determine the optimum spark timing 352, for example, based on the APC 328, the engine speed 324, and/or one or more other operating parameters. The spark timing module 356 may determine the optimum spark timing 352, for example, using a function or mapping.

A difference module 360 generates a CA50 difference 364 based on a difference between the second CA50 348 and the first CA50 336. For example, the difference module 360 may set the CA50 difference 364 based on or equal to the second CA50 minus the first CA50 336.

A third CA50 module 368 determines a third CA50 372. The third CA50 module 368 may update the third CA50 372 for each combustion event. The third CA50 module 368 determines the third CA50 372, for example, based on the engine speed 324 and the APC 328. The third CA50 module 368 may determine the third CA50 372, for example, using a function or mapping that relates engine speeds and APCs to third CA50 values. This function or mapping may be calibrated based on use of the optimum spark timings.

A summer module 376 sums the CA50 difference 364 with the third CA50 372 to generate the present CA50 296. In this manner, the third CA50 is increased or decreased based on the CA50 difference to account for any difference in CA50 caused by the spark timing 340 if the spark timing 340 is different than the optimum spark timing 352 under the operating conditions. As described above, one or more engine actuators may be adjusted based on the present CA50 296. For example, the wastegate 162 may be opened and/or fueling may be increased as the present CA50 retards.

Figure 4:
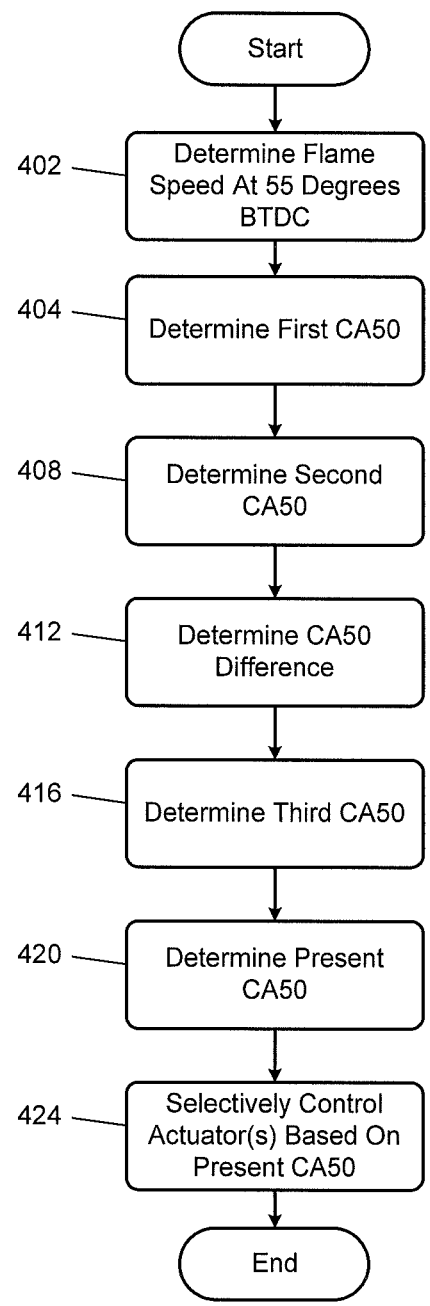
FIG. 4 is a flowchart depicting an example method of determining the CA50 of a combustion event and controlling an engine.

FIG. 4 is a flowchart depicting an example method of estimating the present CA50 296 and controlling one or more engine actuators. Control begins with 402 where the flame speed module 304 determines the flame speed 308 at 55 degrees BTDC. The flame speed module 304 determines the flame speed 308 at 55 degrees BTDC based on the intake cam phaser angle 312, the exhaust cam phaser angle 316, the barometric pressure 320, the engine speed 324, and the APC 328.

The first CA50 module 332 determines the first CA50 336 at 404. The first CA50 module 332 determines the first CA50 336 using a function or mapping that relates the flame speed 308 at 55 degrees BTDC, the engine speed 324, the APC 328, and the spark timing 340 to a CA50 value. The second CA50 module 344 determines the second CA50 348 at 408 using the same function or mapping that relates the flame speed 308 at 55 degrees BTDC, the engine speed 324, the APC 328, and the optimum spark timing 352 to a CA50 value. The spark timing module 356 determines the optimum spark timing 352 based on the current engine operating conditions, such as the engine speed 324, the APC 328, and/or one or more other suitable engine operating parameters.

At 412, the difference module 360 determines the CA50 difference 364 based on a difference between the first CA50 336 and the second CA50 348. The third CA50 module 368 determines the third CA50 372 at 416. The third CA50 module 368 determines the third CA50 372 using a function or mapping that relates the engine speed 324 and the APC 328 to a CA50 value and that is calibrated based on optimum spark timings.

The summer module 376 sums the CA50 difference 364 with the third CA50 372 at 420 to generate the present CA50 296. One or more engine actuators may be controlled based on the present CA50 296 at 424. For example only, the air control module 228 may open the wastegate 162 as the present CA50 296 retards and/or the fuel control module 240 may increase the fueling rate as the present CA50 296 retards. One or more other engine actuators may be additionally or alternatively controlled based on the present CA50 296. While the example of FIG. 4 is illustrated as ending after 424, the example of FIG. 4 is illustrative of one control loop, and FIG. 4 may be executed for each combustion event, such as each predetermined number of degrees of crankshaft revolution.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. An engine control system of a vehicle, comprising:
    an estimation module that estimates a crankshaft angle where 50 percent of a mass of fuel is burned during a combustion event based on:
        a combustion speed when a crankshaft of an engine is at a predetermined position during the combustion event;
        an engine speed;
        a mass of air per cylinder (APC);
        a spark timing; and
        a predetermined spark timing; and
    an actuator module that controls an engine actuator based on the crankshaft angle where 50 percent of the mass of fuel is burned during the combustion event.

2. The engine control system of claim 1 wherein the estimation module estimates the combustion speed based on an intake cam phaser angle, an exhaust cam phaser angle, a barometric pressure, the APC, and the engine speed.

3. The engine control system of claim 1 wherein the estimation module:
    determines a second crankshaft angle where 50 percent of the mass of fuel is burned during the combustion event based on the engine speed, the APC, the spark timing, and the combustion speed;
    determines a third crankshaft angle where 50 percent of the mass of fuel is burned during the combustion event based on the engine speed, the APC, the predetermined spark timing, and the combustion speed; and
    determines the crankshaft angle where 50 percent of the mass of fuel is burned during the combustion event based on the second and third crankshaft angles.

4. The engine control system of claim 3 wherein the estimation module:
    determines a fourth crankshaft angle where 50 percent of the mass of fuel is burned during the combustion event based on the engine speed and the APC; and
    determines the crankshaft angle where 50 percent of the mass of fuel is burned during the combustion event based on the second, third, and fourth crankshaft angles.

5. The engine control system of claim 4 wherein the estimation module:
    determines a difference between the second and third crankshaft angles; and
    sets the crankshaft angle where 50 percent of the mass of fuel is burned during the combustion event based on a sum of the difference and the fourth crankshaft angle.

6. The engine control system of claim 3 wherein the estimation module determines the second and third crankshaft angles using one relationship that relates engine speeds, combustion speeds, APCs, and spark timings to crankshaft angles where 50 percent of masses of fuel are burned.

7. The engine control system of claim 1 wherein the estimation module determines the predetermined spark timing based on the engine speed and the APC.

8. The engine control system of claim 1 wherein the predetermined position is 55 degrees before top dead center.

9. The engine control system of claim 1 wherein the actuator module opens a wastegate of a turbocharger in response to retardation of the crankshaft angle where 50 percent of the mass of fuel is burned.

10. The engine control system of claim 1 wherein the actuator module increases fueling in response to retardation of the crankshaft angle where 50 percent of the mass of fuel is burned.

11. An engine control method for a vehicle, comprising:
    estimating a crankshaft angle where 50 percent of a mass of fuel is burned during a combustion event based on:
        a combustion speed when a crankshaft of an engine is at a predetermined position during the combustion event;
        an engine speed;
        a mass of air per cylinder (APC);
        a spark timing; and
        a predetermined spark timing; and
    controlling an engine actuator based on the crankshaft angle where 50 percent of the mass of fuel is burned during the combustion event.

12. The engine control method of claim 11 further comprising estimating the combustion speed based on an intake cam phaser angle, an exhaust cam phaser angle, a barometric pressure, the APC, and the engine speed.

13. The engine control method of claim 11 further comprising:
    determining a second crankshaft angle where 50 percent of the mass of fuel is burned during the combustion event based on the engine speed, the APC, the spark timing, and the combustion speed;
    determining a third crankshaft angle where 50 percent of the mass of fuel is burned during the combustion event based on the engine speed, the APC, the predetermined spark timing, and the combustion speed; and estimating the crankshaft angle where 50 percent of the mass of fuel is burned during the combustion event based on the second and third crankshaft angles.

14. The engine control method of claim 13 further comprising:
determining a fourth crankshaft angle where 50 percent of the mass of fuel is burned during the combustion event based on the engine speed and the APC; and
estimating the crankshaft angle where 50 percent of the mass of fuel is burned during the combustion event based on the second, third, and fourth crankshaft angles.

15. The engine control method of claim 14 further comprising:
determining a difference between the second and third crankshaft angles; and
setting the crankshaft angle where 50 percent of the mass of fuel is burned during the combustion event based on a sum of the difference and the fourth crankshaft angle.

16. The engine control method of claim 13 further comprising determining the second and third crankshaft angles using one relationship that relates engine speeds, combustion speeds, APCs, and spark timings to crankshaft angles where 50 percent of masses of fuel are burned.

17. The engine control method of claim 11 further comprising determining the predetermined spark timing based on the engine speed and the APC.

18. The engine control method of claim 11 wherein the predetermined position is 55 degrees before top dead center.

19. The engine control method of claim 11 wherein the controlling an engine actuator includes opening a wastegate of a turbocharger in response to retardation of the crankshaft angle where 50 percent of the mass of fuel is burned.

20. The engine control method of claim 11 wherein the controlling an engine actuator includes increasing fueling in response to retardation of the crankshaft angle where 50 percent of the mass of fuel is burned.

* * * * *